US008406776B2

(12) United States Patent
Jallon

(10) Patent No.: US 8,406,776 B2
(45) Date of Patent: Mar. 26, 2013

(54) METHOD OF SEARCHING FOR FREE BAND FOR A COGNITIVE TELECOMMUNICATION TERMINAL

(75) Inventor: Pierre Jallon, Grenoble (FR)

(73) Assignee: Commissariat a l'Energie Atomique, Paris (FR)

(*) Notice: Subject to any disclaimer, the term of this patent is extended or adjusted under 35 U.S.C. 154(b) by 885 days.

(21) Appl. No.: 12/256,752

(22) Filed: Oct. 23, 2008

(65) Prior Publication Data
US 2009/0111478 A1    Apr. 30, 2009

(30) Foreign Application Priority Data
Oct. 24, 2007 (FR) .................................. 07 58550

(51) Int. Cl.
*H04W 72/00* (2009.01)

(52) U.S. Cl. .................... 455/450; 455/434; 455/452.1; 455/452.2; 455/454; 455/455; 455/509; 455/512; 455/513

(58) Field of Classification Search .................. 455/450
See application file for complete search history.

(56) References Cited

U.S. PATENT DOCUMENTS

| 7,860,197 | B2* | 12/2010 | Hur et al. ........................ 375/344 |
| 2004/0151137 | A1 | 8/2004 | McFarland et al. |
| 2005/0221846 | A1* | 10/2005 | Jansen ........................... 455/502 |
| 2006/0291580 | A1* | 12/2006 | Horvitz ......................... 375/265 |
| 2007/0042733 | A1* | 2/2007 | Tomioka ...................... 455/179.1 |
| 2007/0066234 | A1* | 3/2007 | Lastinger et al. ........... 455/67.11 |
| 2008/0102849 | A1* | 5/2008 | Neel et al. ................... 455/452.2 |
| 2008/0139213 | A1* | 6/2008 | Coersmeier .................. 455/450 |
| 2008/0155249 | A1* | 6/2008 | Backof et al. ................. 713/100 |
| 2008/0167064 | A1* | 7/2008 | Bar-Ness et al. ............. 455/522 |
| 2009/0047916 | A1* | 2/2009 | Haykin ....................... 455/115.1 |

FOREIGN PATENT DOCUMENTS

EP    1 750 467 A1    2/2007

OTHER PUBLICATIONS

French Search Report.
Mitola: "Cognitive radio: an integrated agent architecture for software defined radio", XP-002475924, 2000.
Sofer et al., "IEEE 802.22 WRAN Channel Modeling" Doc: IEEE802.22-05/0055r6, Sep. 2005.
Chang et al., "IEEE P802.22 Wireless RANs Sensing Scheme for DVB-T" Doc. IEEE 802.22-05/0263r0, Nov. 2006.
Cordeiro et al., "IEEE 802.22: An Introduction to the First Wireless Standard based on Cognitive Radios" Journal of Communications, vol. 1, No. 1. Apr. 1, 2006.

* cited by examiner

*Primary Examiner* — Charles Appiah
*Assistant Examiner* — Mazda Sabouri
(74) *Attorney, Agent, or Firm* — Pearne & Gordon LLP

(57) ABSTRACT

This invention relates to a method of searching for free band using a cognitive telecommunication terminal operating in a zone covered by a primary telecommunication system using a plurality of frequency bands (B). The terminal classifies said bands as a function of their conditional probabilities of being available ($p(b_{max}|B_{occ},B_{opp})$), knowing a first set of bands already occupied by the primary telecommunication system ($B_{occ}$) and a second set of bands not occupied by this primary telecommunication system but already used by another cognitive terminal ($B_{opp}$), said terminal beginning its search by the band with the highest conditional probability ($b_{max}$).

7 Claims, 2 Drawing Sheets

METHOD OF SEARCHING FOR FREE BAND FOR A COGNITIVE TELECOMMUNICATION TERMINAL

TECHNICAL DOMAIN

This invention relates to cognitive radio systems, particularly those intended for transmission on bands allocated to the DVB-T digital video broadcasting-terrestrial system.

STATE OF PRIOR ART

The increasing congestion of the spectrum has made it necessary to envisage communication systems capable of coexisting with previously allocated frequency band systems called primary systems. A large amount of research is currently being made on two coexistence strategies. The first consists of using a very low signal level due to very strong spectrum spreading, which is the method used for Ultra Wide Band (UWB) systems. The second consists of cognitively using part of the spectrum that is occasionally or temporarily unoccupied, in other words the cognitive radio method. A description of cognitive radio is given in the founding thesis by J. Mitola entitled <<Cognitive radio: an integrated agent architecture for software defined radio>>, Royal Institute of Technology, Stockholm, PhD Dissertation, May 8 2000.

The principle of cognitive radio has been used particularly for the development of Wireless Regional Area Networks (WRAN). These networks are currently undergoing a standardization procedure within the IEEE 802.22 work group. More precisely, this standard currently being produced proposes to make cognitive use of vacant UHF and VHF bands to make point to point wireless transmission in a WRAN network. In particular it is envisaged that UHF bands allocated to the DVB-T (Digital Video Broadcast-Terrestrial) television system can be used for this purpose. The DVB-T standard uses an OFDM (Orthogonal Frequency Division Multiplexing) modulation to transmit compressed video/audio streams. An introduction to IEEE standard 802.22 is given in the article by C. Cordeiro et al. entitled <<IEEE 802.22: an introduction to the first wireless standard base on cognitive radios>>, published in the Journal of Communications, Vol. 1, No. 1, April 2006, pp. 38-47.

Before being able to emit in a given UHF band, a WRAN network emitter needs to determine whether or not this band is already occupied by the primary system. It has been proposed that the autocorrelation properties of an OFDM signal can be used to detect if a DVB-T signal is present in a given band, making use of the presence of the cyclic prefix. A description of such a detection method is given in the article by Soo-Young Chang entitled <<IEEE P802.22 Wireless RANs-sensing scheme for DVB-T>>, published in November 2006. Another OFDM signal detection algorithm is described in a French application not published No. 07 55394 deposited on 31.05.2007 in the name of the applicant.

After assuring that the band is not occupied by a primary system, the emitter must still check that the band in question has not already been used by a secondary system, by means of a specific detection algorithm.

In the case of a WRAN network, terminals of the cognitive radio system themselves use an OFDM modulation. The presence of a secondary system can then be detected by the above-mentioned detection method.

In order to find a free band, a cognitive terminal must test the frequency bands allocated to the primary system sequentially, usually in increasing or decreasing order. For example, in the case of a WRAN network, the UHF channels 21 to 69 must be scanned in sequence. This scanning may be difficult and considerably reduce the network access speed.

Therefore, the purpose of this invention is to propose a fast and efficient method of searching for free band for a cognitive telecommunication terminal.

PRESENTATION OF THE INVENTION

This invention is defined by a method of searching for free band using a cognitive telecommunication terminal operating in a zone covered by a primary telecommunication system using a plurality of frequency bands, according to which said terminal classifies said bands as a function of their conditional probabilities of not being occupied by the primary telecommunication system, knowing a first set of bands already occupied by the primary telecommunication system and a second set of bands not occupied by this primary telecommunication system but already used by another cognitive terminal, said terminal beginning its search by the band with the highest conditional probability.

The method advantageously uses a plurality of iterations, said first and second sets being updated during each iteration using the result of detection in the band with the highest conditional probability during this iteration.

During each iteration, the terminal measures the power of a signal from the primary telecommunication system in the band with the highest conditional probability.

If said power is greater than a predetermined threshold value, said first set is increased by said band.

If said power is less than a predetermined threshold value, the terminal may test if another cognitive terminal already uses said band.

If said band is already used by another cognitive terminal to emit, the second set is increased by said band.

If the band is not used by another cognitive terminal to emit, said band is then selected by said cognitive terminal.

Preferably, said zone is partitioned into elementary zones and, for each given band, said conditional probability of not being occupied by the primary telecommunication system, called the conditional probability of being available, is calculated from the corresponding probabilities that the different bands are available inside the different elementary zones, and the corresponding areas of these zones in which said given band is available.

In the method presented above, the primary telecommunication system may for example be a system for broadcasting DVB-T type television signals.

BRIEF DESCRIPTION OF THE DRAWINGS

Other characteristics and advantages of the invention will become clear after reading a preferred embodiment of the invention with reference to the attached figures among which.

DETAILED PRESENTATION OF PARTICULAR EMBODIMENTS

Figure 1:
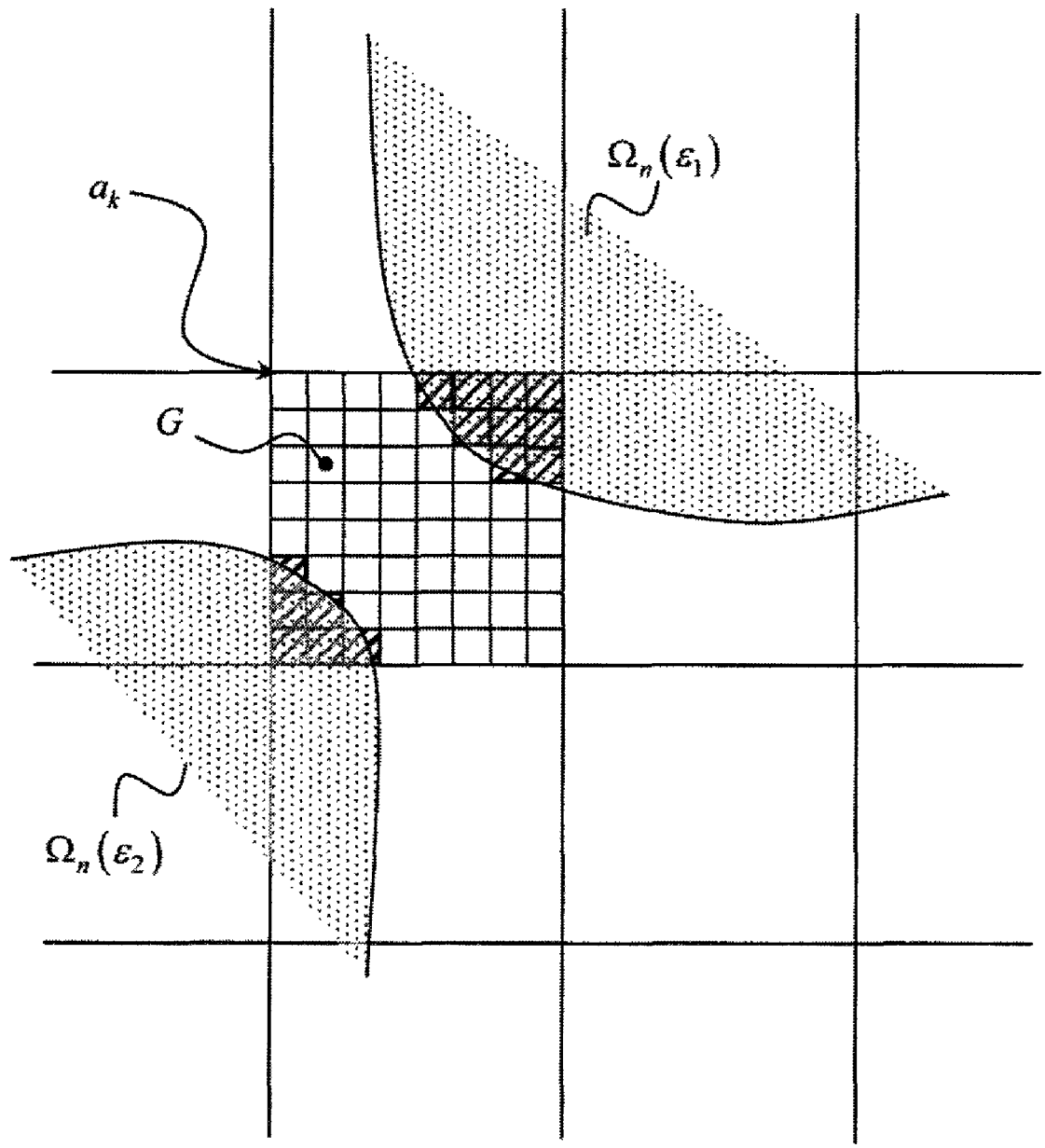
FIG. 1 shows an elementary zone covered by a primary telecommunication system.

We will once again consider the situation of a primary telecommunication system, for example the DVB-T system and a secondary telecommunication system such as an 802.22 network.

In the remaining description, we will consider that a set of frequency bands $B=\{b_1,b_2,\ldots,b_N\}$ is allocated to the primary telecommunication system. This system is deployed on a given geographic zone A divided into separate elementary zones $a_k$ such that $$A = \bigcup_k a_k,$$

otherwise said elementary zones define a partition of the zone A. The emitters in the primary system are distributed in zone A and use frequency bands $b_n$, $n=1,\ldots,N$ according to a predetermined frequency allocation plan.

As a non-limitative example, the primary telecommunication system may be composed of Terrestrial Digital Television (DTV) emitters, zone A will cover France and the elementary zones are squares with 50 km long sides.

A cognitive terminal in the secondary telecommunication system located in the zone concerned must make a search for free band in the set B to initiate or to continue a communication. In the following description, an available band means a band allocated to the primary system in which the terminal has not detected a signal from the primary system. Free band means an available band in which the cognitive terminal has not detected a signal from another terminal of the secondary system.

The basic idea of the invention is to browse through the set B, beginning with bands with the highest probability of not being used by the primary system, in other words bands with the highest probability of being available.

A detection threshold could be fixed to help detect if there is a primary system signal present in the band. For example, if the primary system is the DTV system, a threshold of −116 dBm will be set: the band will be said to be available if there is no DVB-T signal present with a power level greater than this threshold.

During its search, the cognitive terminal will probe the bands in sequence and thus obtain information about their corresponding occupancies by the primary system and if applicable, by terminals in the secondary system. Knowing the frequency allocation plan of emitters and their corresponding positions, said information provides information in terms of probability about the situation of the terminal in a specific elementary zone of A. Probabilities of the terminal being present for these different elementary zones in turn make it possible to refine the probabilities about whether or not these bands are available. Thus, from one iteration to the next, the probabilities of occupancy by the primary system are updated during each iteration, the band with the lowest probability of occupancy being selected to be tested by the terminal.

We will use the following conventions in the remaining description:

$B_{occ}$ is the sub-set of B in which the terminal has detected the presence of a signal from the primary system. More precisely, if $b_n \in B_{occ}$, the terminal is in a zone in which cognitive use of the $b_n$ band would disturb reception of the primary system.

$B_{opp}$ is the sub-set of B in which the terminal detects lack of a signal from the primary system, but the presence of a signal from the secondary system. More precisely, if $b_n \in B_{opp}$, the terminal must be in a zone in which a cognitive use of the band $b_n$ does not disturb reception of the primary system. However, the band in question can be used cognitively by the terminal due to the fact that it is already used by another cognitive terminal in the secondary system.

$p(b_n|B_{occ},B_{opp})$ is the probability that the band $b_n$ is available, knowing sets of bands occupied $B_{occ}$,$B_{opp}$ defined above.

since the elementary zones denoted $a_k$ form a partition of A, the conditional probability $p(b_n|B_{occ},B_{opp})$ can be broken down as follows:

$$p(b_n | B_{occ}, B_{opp}) = \sum_{a_k \in A} p(b_n | a_k, B_{occ}, B_{opp}) p(a_k | B_{occ}, B_{opp}) \quad (1)$$
$$= \sum_{a_k \in A} p(b_n | a_k) p(a_k | B_{occ}, B_{opp})$$

given that $p(b_n|a_k,B_{occ},B_{opp})=p(b_n|a_k)$. Once zone $a_k$ is known, knowledge of $B_{occ}$,$B_{opp}$ does not provide any additional information that can help identify available bands in this zone. The second line of (1) means that the probability that a band is available depends on probabilities of the terminal being present in the different zones $a_k$ considering detection results $B_{occ}$,$B_{opp}$, and the probability that said band is available, for each of these zones.

More precisely, the probability $p(b_n|a_k)$ is the probability that the band $b_n$ is available if the terminal is in the elementary zone $a_k$. This probability, denoted $\beta_{n,k}$, is equal to:

$$\beta_{n,k} = \frac{\sigma_k^n}{\sigma_k} \quad (2)$$

where $\sigma_k$ is the area of the elementary zone $a_k$ and $\sigma_k^n$ is the area of $a_k$ in which the band $b_n$ is available.

In practice, the following procedure is used:

For each band $b_i \in B$, knowing the positions of the emitters in the primary system emitting in the band $b_i$ and their corresponding emission powers, the zones $\Omega_i$ in which this band $b_i$ cannot be used cognitively are determined. More precisely, for each emitter $\epsilon$ using this band, the zone $\Omega_i(\epsilon)$ is defined as the set of points in which the electrical field is greater than a given reception threshold $T_1$. For digital terrestrial television, a critical threshold $T_1=25.4$ dB($\mu$V/m) can be used, namely $T_1=-116$ dBm. For example, we can determine the value of the electrical field at a DVB-T signal point by using the propagation model described by E. Sofer et al. in document IEEE 802.22 entitled <<WRAN Channel modeling>>, r6, dated 30.08.2005.

For a given elementary zone $a_k$ and a given band $b_n$, a search is made for points belonging to $a_k$ for which the band $b_n$ is available. More precisely, $a_k$ is discretised using small squares and the grid of points formed by the centres of these squares is considered. A test is made for each point G in this grid to see if it is in one of these zones $\Omega_n$. If so, the band $b_n$ is not available in the elementary square with centre G.

FIG. 1 shows an elementary zone $a_k$ and zones $\Omega_n$ relative to two emitters $\epsilon_1$ and $\epsilon_2$, in this case assumed to occupy band $b_n$ in the zone $a_k$. Squares in which the band $b_n$ is not available are shown by a cross hatched pattern.

The area $\sigma_k^n$ is nothing more than the sum of the areas of the squares of the elementary zone $a_k$ for which band $b_n$ is available, in other words the squares that are left blank.

It is important to note that the calculation of conditional probabilities $p(b_n|a_k)$ can be made once for all once the positions and the corresponding powers of the primary system emitters are known.

The second conditional probability that arises in expression (1) is the probability that the terminal is in zone $a_k$, knowing that:

(a) The terminal has detected a signal from the primary system in the $b_n \in B_{occ}$ bands and (b) It has checked that there is no signal from the primary system in the $b_n \in B_{opp}$ bands and detected the presence of signal from the secondary system.

This probability can be expressed using Bayes theorem:

$$p(a_k \mid B_{occ}, B_{opp}) = \frac{p(a_k) p(B_{occ}, B_{opp} \mid a_k)}{p(B_{occ}, B_{opp})} \quad (3)$$

Assuming that events $\{b_i \in B_{opp} \mid a_k\}$ and $\{b_j \in B_{opp} \mid a_k\}$ are independent if $i \neq j$, the expression $p(B_{occ}, B_{opp} \mid a_k)$ can be factorized in the form:

$$p(B_{occ}, B_{opp} \mid a_k) = \prod_{b_i \in B_{occ}} p(b_i \mid a_k) \prod_{b_j \in B_{opp}} p(b_j \mid a_k) \quad (4)$$

The probability $p(b_i \mid a_k)$ for $b_i \in B_{occ}$ is the probability that the band $b_i$ is used by the primary system knowing that the terminal is in the zone $a_k$, in other words the probability that the terminal cannot use band $b_i$ because it is occupied by the primary system, namely $p(b_i \mid a_k) = 1 - \beta_{i,k}$.

similarly, the probability $p(b_j \mid a_k)$ for $b_j \in B_{opp}$ is the probability that the band $b_j$ is available in zone $a_k$. Therefore it is equal to the probability $\beta_{j,k}$.

The result is that the conditional probability $p(a_k \mid B_{occ}, B_{opp})$ can be expressed as follows:

$$p(a_k \mid B_{occ}, B_{opp}) = \frac{1}{p(B_{occ}, B_{opp})} \frac{\sigma_k}{\sigma_A} \prod_{b_i \in B_{occ}} (1 - \beta_{i,k}) \prod_{b_j \in B_{opp}} \beta_{j,k} \quad (5)$$

where $$\sigma_A = \sum_{i=1}^{K} \sigma_i$$

is the total area, and K is the number of elementary zones.

The area $\sigma_A$ and the probability $p(B_{occ}, B_{opp})$ in (5) are common factors that do not depend on $a_k$. Finally, if we normalise the probability $p(a_k \mid B_{occ}, B_{opp})$ by the probability that the terminal is located in an arbitrary zone, knowing $B_{occ}, B_{opp}$:

$$p(a_k \mid B_{occ}, B_{opp}) = \frac{\sigma_k \prod_{b_i \in B_{occ}} (1 - \beta_{i,k}) \prod_{b_j \in B_{opp}} \beta_{j,k}}{\sum_l p(a_l \mid B_{occ}, B_{opp})} \quad (6)$$

and therefore, by substituting expressions (2) and (6) in (1):

$$p(b_n \mid B_{occ}, B_{opp}) = \sum_k \frac{\sigma_k^n \prod_{b_i \in B_{occ}} (1 - \beta_{i,k}) \prod_{b_j \in B_{opp}} \beta_{j,k}}{\sum_l p(a_l \mid B_{occ}, B_{opp})} \quad (7)$$

The terms $\sigma_k^j$, $\beta_{i,k}$ for $i=1, \ldots, N$ and $k=1, \ldots, K$ can be determined once for all because they are only dependent on deployment of the primary network in zone A.

Figure 2:
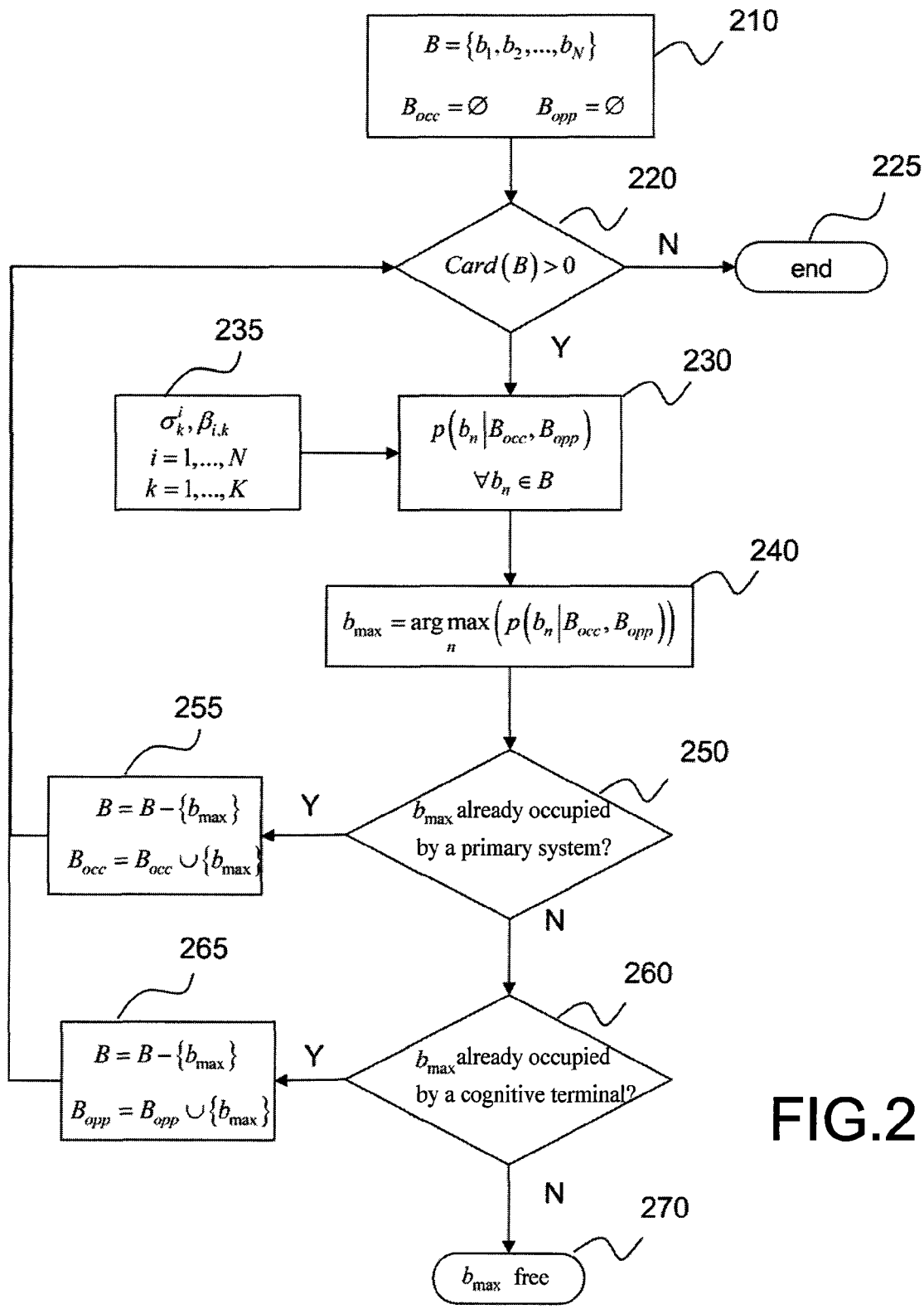
FIG. 2 shows the method used by a cognitive terminal to search for free band, according to one embodiment of the invention.

A cognitive terminal located in zone A uses conditional probabilities $p(b_n \mid B_{occ}, B_{opp})$ of the different bands of B to search for free band as shown in FIG. 2.

The search method begins with an initialization step, 210: $B = \{b_1, b_2, \ldots, b_N\}$ is the set of bands that the primary system can use;

$B_{occ}$ and $B_{opp}$ are initialized as empty sets.

In step 220, it is tested if $Card(B) > 0$. If so, we go on to calculation step 230. If not, step 225 terminates with an observation of failure: the cognitive terminal cannot use any of the bands in B to transmit.

In step 230, the terminal calculates the probabilities $p(b_n \mid B_{occ}, B_{opp})$ starting from current sets $B_{occ}, B_{opp}$ and values $\sigma_k^i$, $\beta_{i,k}$ for $i=1, \ldots, N$ and $k=1, \ldots, K$ stored in a memory 235.

In step 240, the probabilities $p(b_n \mid B_{occ}, B_{opp})$ are sorted and the terminal determines:

$$b_{max} = \underset{n}{\operatorname{argmax}}(p(b_n \mid B_{occ}, B_{opp})) \quad (8)$$

In step 250, the terminal detects if the band $b_{max}$ is occupied by the primary system. More precisely:

if $p(b_{max} \mid B_{occ}, B_{opp}) = 1$, the terminal concludes that the band $b_{max}$ is not occupied by the primary system. This corresponds to a situation in which coverage zones of emitters using $b_{max}$ are sufficiently far from the location at which the terminal is located;

otherwise, the terminal detects if the primary signal level received in this band is less than a predetermined threshold value (for example if the primary system is the DTV system and if the emitted signals are DVB-T signals, a threshold value of −116 dBm can be used). If not, it will be assumed that the band $b_{max}$ is occupied by the primary system and we go onto the update step 255. On the other hand, if the band $b_{max}$ is not occupied by the primary system, in other words if $b_{max}$ is available, we go on to detection step 260.

In step 260, we test if the band $b_{max}$ is already used by another cognitive terminal. If not, the terminal has found a free band and the algorithm stops at 270. Conversely, we go on to update step 265.

In step 255, B is updated by $B = B - \{b_{max}\}$, and $B_{occ}$ is updated, by setting $B_{occ} = \{B_{occ} \cup b_{max}\}$;

In step 265, the set B is updated by $B = B - \{b_{max}\}$ and $B_{opp}$ is updated, by setting $B_{opp} = B_{opp} \cup \{b_{max}\}$.

In both cases, one goes back to test step 220.

The method to search for free band may be repeated periodically, particularly if the cognitive terminal is mobile.

The invention claimed is:

1. A method of searching for free band using a cognitive telecommunication terminal operating in a zone covered by a primary telecommunication system using a plurality of frequency bands, wherein said terminal:

calculates, for each band of said plurality, a conditional probability that this band is not occupied, knowing a first set of bands already occupied by the primary telecommunication system and knowing a second set of bands not occupied by the primary telecommunication system but already used by another cognitive terminal, classifies said bands as a function of the conditional probabilities thus calculated; and searches for a free band starting with the band with the highest conditional probability and measuring therein a power of a signal from the primary telecommunication system, wherein said zone is partitioned into elementary zones and, for each given band, and wherein said conditional probability of not being occupied by the primary telecommunication system, called the conditional probability of being available, is calculated from the corresponding probabilities that the different bands are available inside the different elementary zones and the corresponding areas of these zones in which said given band is available.

2. The method of searching for free band according to claim 1, the method uses a plurality of iterations, said first and second sets being updated during each iteration using the result of detection in the band with the highest conditional probability during this iteration.

3. The method of searching for free band according to claim 2, wherein, if said power is greater than a predetermined threshold value, said first set is increased by said band.

4. The method of searching for free band according to claim 1, wherein, if said power is less than a predetermined threshold value, the terminal tests if another cognitive terminal already uses said band.

5. The method of searching for free band according to claim 4, wherein, if said band is already used by another cognitive terminal to emit, the second set is increased by said band.

6. The method of searching for free band according to claim 4, wherein, if the band is not used by another cognitive terminal to emit, said band is then selected by said cognitive terminal.

7. The method of searching for free band according to claim 1, wherein the primary telecommunication system is a system for broadcasting DVB-T type television signals.

* * * * *

UNITED STATES PATENT AND TRADEMARK OFFICE
CERTIFICATE OF CORRECTION

PATENT NO. : 8,406,776 B2
APPLICATION NO. : 12/256752
DATED : March 26, 2013
INVENTOR(S) : Pierre Jallon It is certified that error appears in the above-identified patent and that said Letters Patent is hereby corrected as shown below:

In the Specifications:

Column 5, line 33, delete the word "similarly" and insert -- Similarly --

Column 6, line 57, delete " $B_{occ} = \{B_{occ} \cup b_{max}\}$ " and insert -- $B_{occ} = B_{occ} \cup \{b_{max}\}$ --

Signed and Sealed this
Eleventh Day of June, 2013

Teresa Stanek Rea
*Acting Director of the United States Patent and Trademark Office*